L. F. ADT.
BRIDGE SPRING FOR EYEGLASSES.
APPLICATION FILED JUNE 28, 1906.

1,024,814.

Patented Apr. 30, 1912.

UNITED STATES PATENT OFFICE.

LEO F. ADT, OF ALBANY, NEW YORK.

BRIDGE-SPRING FOR EYEGLASSES.

1,024,814. Specification of Letters Patent. Patented Apr. 30, 1912.

Application filed June 28, 1906. Serial No. 323,923.

*To all whom it may concern:*

Be it known that I, LEO F. ADT, of Albany, in the county of Albany and State of New York, have invented certain new and useful Improvements in Bridge-Springs for Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and particularly to the kind employing a spring bridge for permitting relative movement of the lenses in fitting and removing the eyeglasses, and the object of the invention is to provide an improved spring of ample length to afford the greatest movement to the lenses in operating the guards without liability of breakage, and which will still possess sufficient strength and stiffness to hold the lenses properly positioned relatively to the eyes of the wearer.

To these and other ends the invention consists of certain improvements and combinations of parts, all as will be hereinafter more fully explained, the novel features being pointed out in the claims at the end of the specification.

Figure 1:
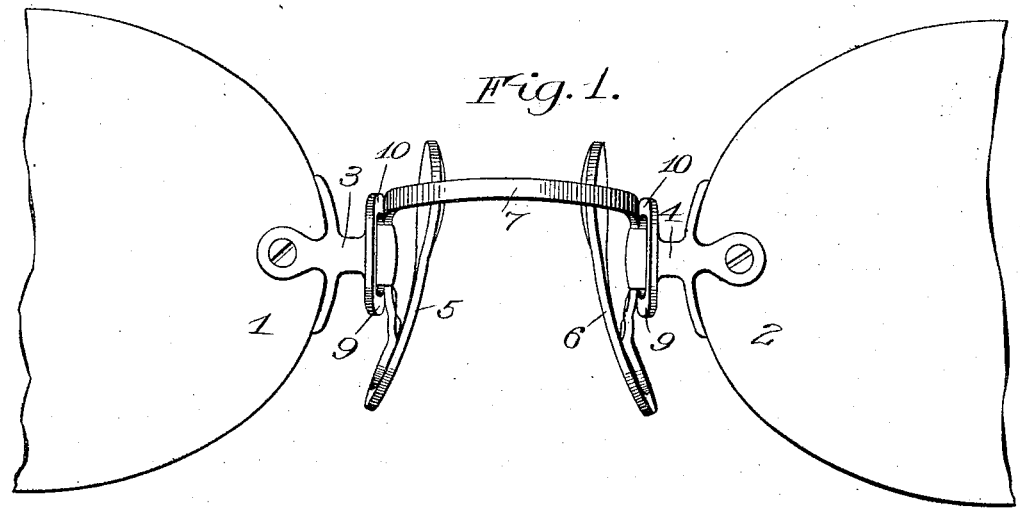
Figure 2:
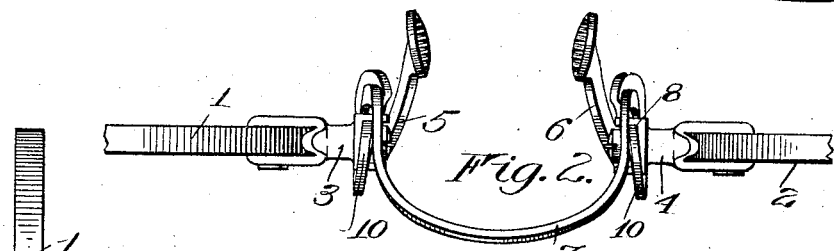
Figure 3:
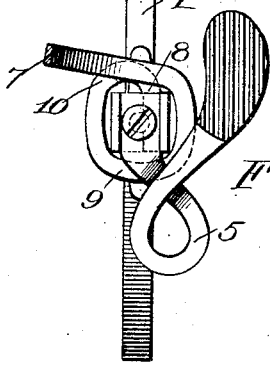
Figure 4:
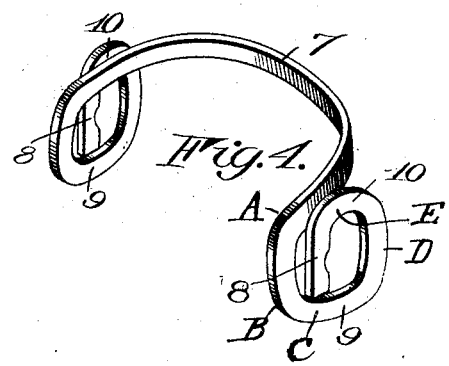

In the drawings: Figure 1 represents a front elevation of a pair of eyeglasses, equipped with a bridge spring constructed in accordance with my invention. Fig. 2 is a top plan view of the mounting shown in Fig. 1. Fig. 3 represents a transverse section through the bridge looking toward the left in Fig. 1; and Fig. 4 is a perspective view of the bridge spring as viewed from the rear.

Similar reference numerals in the several figures indicate similar parts.

A bridge spring constructed in accordance with my present invention possesses ample action to insure ease of operation of the lenses to produce the requisite movement of the nose guards, and is so formed that the weakness usually found in springs of great flexibility, is avoided, while the greater portion of the material composing the bridge is so arranged so to be the least conspicuous as the eyeglasses are viewed from the front.

The present embodiment of my invention is shown in connection with a pair of eyeglasses of the ordinary type, embodying, generally, the lenses 1 and 2, provided with suitable attaching devices 3 and 4, the nose guards 5 and 6 being of any desired form, and secured by screws or other suitable means to their respective attaching devices.

The bridge spring embodying my present invention comprises generally, (referring more particularly to Fig. 4) a central portion 7, preferably bowed forwardly to span the bridge of the wearer's nose, and if desired, may rest thereon, the extremities which are preferably uniformly resilient extending rearwardly above the plane of the attaching devices at A, thence extending downwardly in rear thereof at B, thence forwardly beneath the attaching devices at C, extending upwardly at D in front of the attaching devices to form a loop 9 at B, C, D, and having an attaching lug 8 at the termination thereof leading to the attaching devices from above, by a bend E providing at 10 a second loop D, E, 8, the two loops at each extremity of the bridge thus forming, in the present instance, a coil which encircles its respective attaching device in a plane arranged transversely of the plane of the lenses. A portion of the bridge beyond each loop 9, preferably the loop 10 thereof, in the neighborhood of the bend E, rests at the outer side of each portion of the bridge intermediate of the central portion and the loops or bends, to form approximate centers about which the lenses and the guards attached thereto will turn as the lenses are operated to apply and remove the eyeglasses, these coöperating portions thus provid'l serving as stops to prevent inward movement of the attaching devices that would tend to neutralize the separating movement of the guards when the lenses are operated, as would be liable to occur if these fulcrums were not employed, and as the fulcrums or centers are arranged forward of the guards the greatest separating movement of the guards is obtained with a given movement of the lenses. In the present instance the intermediate portion or bend E of the second loop 10 rocks against the portion A of the bridge.

It is generally preferable to form the spring of substantially flat material, for in this way not only is a spring of ample strength secured, but by bending the material edgewise to form the loops or coil 9, the material, as well as the loops or bends, will be presented edgewise when viewed from the front, so that the mounting will not appear conspicuous, and by forming the loops or bends in accordance with my invention, the bending or twisting action thereon when the lenses are operated, takes place from the attached ends throughout the extent of the loop or bend, and as the extremities of these bends are held from inward movement by engagement with intermediate portions of the bridge inward movement thereof is prevented, and the greatest separating movement of the nose guards is insured. This arrangement utilizes the resiliency of the bridge both forward and in rear of the attaching device, affording a resilient connection which is inconspicuous when viewed from the front.

I claim as my invention:

1. In eyeglasses, the combination with the lenses, and the nose-guards, of a bridge spring for connecting the lenses embodying a central portion adapted to span the wearer's nose, resilient loops at the ends of the central portion and stops arranged to coöperate with the outer sides of the bridge intermediate of its central portion and its attached portion.

2. In eyeglasses, the combination with the lenses, and the nose-guards attached thereto, of a bridge spring connecting the lenses embodying a central portion, and resilient loops arranged in planes transverse of the lenses beyond the central portion, fulcrums being arranged to coöperate with the outer sides of the bridge between its central portion and said loops to prevent inward movement of the inner ends of the lenses when the latter are turned to operate the guards.

3. In eyeglasses, the combination with the lenses, and the nose-guards movable therewith, of a bridge spring embodying a central portion, and resilient loops arranged in planes transverse to the lenses, portions of the bridge beyond the loops being arranged to engage at the outer side of the bridge at points between its central and looped portions.

4. In eyeglasses, the combination with the lenses provided with suitable attaching devices, and nose-guards connected thereto, of a bridge spring adapted to connect the lenses and having resilient loops near each end embracing their respective attaching devices and having their ends attached thereto, portions of the spring being arranged to engage other portions thereof at points between the loops and its central portion to serve as centers for the turning movement of the lenses and guards.

5. In eyeglasses, the combination with the lenses, and a bridge for connecting the lenses embodying a forwardly bowed central portion and resilient portions at the ends of the central portion, of stops arranged to engage the outer sides of the central portion to limit the swinging of the lenses.

6. In eyeglasses, the combination with the lenses provided with suitable attaching devices having boxes, and nose-guards connected to said devices of a bridge spring for connecting the lenses having its end portions extending rearwardly over the attaching devices and forming convolutions about the latter, the ends of the convolutions leading into the boxes from above.

7. In eyeglasses, the combination with the lenses provided with suitable attaching devices, and nose-guards connected thereto, of a bridge spring for connecting the lenses embodying a central portion adapted to span the wearer's nose, and having its end portions extended rearwardly above the plane of the attaching devices, thence downwardly, forwardly, upwardly in front of the attaching devices, and having the ends extending downwardly to the attaching devices.

8. In eyeglasses, the combination with the lenses provided with suitable attaching devices and noseguards connected thereto, of a bridge spring for connecting the lenses embodying a central portion adapted to span the wearer's nose and having its end portions extending rearwardly above the plane of the attaching devices thence downwardly, then beneath them forwardly of the anterior edges of said devices and thence upwardly, thereby producing a laterally resilient loop extending both in front and in rear thereof.

9. In eyeglasses, the combination with a pair of lenses, and nose guards movable therewith, of a bridge spring connecting the lenses and embodying a central portion and resilient loops arranged to engage the central portion to prevent inward movement of the lenses when the latter are turned to separate the guards.

LEO F. ADT.

Witnesses:
F. F. CHURCH,
CLARENCE A. BATEMAN.